US012766943B2

(12) United States Patent
Eberl et al.

(10) Patent No.: US 12,766,943 B2
(45) Date of Patent: Oct. 20, 2026

(54) DEVICE FOR CONTROLLING AN INTERNAL COMBUSTION ENGINE

(71) Applicant: Bayerische Motoren Werke Aktiengesellschaft, Munich (DE)

(72) Inventors: Thomas Eberl, Sauerlach (DE); Maximilian Engl, Friedberg-Bachern (DE); Florian Hartl, Munich (DE); Marcel Kruppa, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 270 days.

(21) Appl. No.: 18/686,088

(22) PCT Filed: Sep. 27, 2022

(86) PCT No.: PCT/EP2022/076829
§ 371 (c)(1),
(2) Date: Feb. 23, 2024

(87) PCT Pub. No.: WO2023/072509
PCT Pub. Date: May 4, 2023

(65) Prior Publication Data

US 2024/0367500 A1 Nov. 7, 2024

(30) Foreign Application Priority Data

Oct. 26, 2021 (DE) ..................... 10 2021 127 892.9

(51) Int. Cl.
*G06F 19/00* (2018.01)
*B60K 6/24* (2007.10)
(Continued)

(52) U.S. Cl.
CPC ................ *B60K 6/24* (2013.01); *F02D 17/02* (2013.01); *F02D 41/0087* (2013.01)

(58) Field of Classification Search
CPC .... B60W 10/06; F02D 41/0087; F02D 17/02; F02D 13/06; F01L 2013/001
(Continued)

(56) References Cited

U.S. PATENT DOCUMENTS 11,499,490 B1 * 11/2022 Kolhouse ............ F02D 41/0072
11,933,237 B2 * 3/2024 Kolhouse ................ F01N 3/021
(Continued)

FOREIGN PATENT DOCUMENTS

DE 10 2010 047 959 A1 5/2011
DE 10 2016 117 556 A1 3/2018
(Continued)

OTHER PUBLICATIONS

Korean-language Office Action issued in Korean Application No. 10-2024-7001103 dated May 19, 2025 with English translation (6 pages)

(Continued)

*Primary Examiner* — Logan M Kraft
*Assistant Examiner* — James J Kim
(74) *Attorney, Agent, or Firm* — Crowell & Moring LLP

(57) ABSTRACT

A device for controlling an internal combustion engine in a motor vehicle, in particular, an electrified hybrid vehicle with a traction electric machine. The internal combustion engine has multiple cylinders, each of which is equipped with at least one outlet valve which can be switched to two stages. An electronic control unit controls: i) suppression of each of a plurality of cylinders of the internal combustion engine for at least one work cycle, wherein the outlet valves are kept closed, ii) actuation of the outlet valves and the inlet valves of the cylinders of the internal combustion engine in a synchronized manner, and iii) after the suppression process has ended, opening of the outlet valve at least in the first
(Continued)

cylinder when the inlet valve is closed, and the enclosed gas is pushed out without being injected and ignited.

19 Claims, 2 Drawing Sheets

(51) Int. Cl.
*F02D 17/02* (2006.01)
*F02D 41/00* (2006.01)

(58) Field of Classification Search
USPC .......................................................... 701/101
See application file for complete search history.

(56) References Cited

U.S. PATENT DOCUMENTS

| | | | | |
|---|---|---|---|---|
| 12,055,104 | B2 * | 8/2024 | Etzel | B60K 6/48 |
| 12,128,875 | B2 * | 10/2024 | Ravichandran | B60W 20/40 |
| 2006/0169245 | A1 | 8/2006 | Zillmer et al. | |
| 2007/0114082 | A1 | 5/2007 | Nozaki et al. | |
| 2011/0083639 | A1 | 4/2011 | Gallon et al. | |
| 2018/0320626 | A1 | 11/2018 | Surnilla et al. | |
| 2020/0088115 | A1 | 3/2020 | Thaler et al. | |
| 2020/0223425 | A1 * | 7/2020 | Ford | B60W 20/15 |
| 2020/0355126 | A1 | 11/2020 | Rollinger et al. | |
| 2023/0033813 | A1 * | 2/2023 | Kurtz | F02M 35/104 |

FOREIGN PATENT DOCUMENTS

| | | | |
|---|---|---|---|
| DE | 10 2018 215 649 | A1 | 3/2020 |
| DE | 10 2019 115 761 | B1 | 12/2020 |
| JP | 2001-140670 | A | 5/2001 |
| JP | 2007-131071 | A | 5/2007 |

OTHER PUBLICATIONS

International Search Report (PCT/ISA/210) issued in PCT Application No. PCT/EP2022/076829 dated Jan. 23, 2023 with English translation (4 pages).
German-language Written Opinion (PCT/ISA/237) issued in PCT Application No. PCT/EP2022/076829 dated Jan. 23, 2023, with English translation (10 pages).
German-language Search Report issued in German Application No. 10 2021 127 892.9 dated Jun. 28, 2022, with partial English translation (11 pages).
Japanese-language Office Action issued in Japanese Application No. 2024-518397 dated Jul. 2, 2026 with English translation (6 pages).
Japanese-language Office Action issued in Japanese Application No. 2024-518397 dated Jul. 8, 2026, with English translation (6 pages).

* cited by examiner

DEVICE FOR CONTROLLING AN INTERNAL COMBUSTION ENGINE

BACKGROUND AND SUMMARY

The present disclosure relates to a device for controlling an internal combustion engine in a motor vehicle, in particular, in an electrified hybrid motor vehicle having an internal combustion engine and an electric motor (traction electric machine) as drive motors.

During the operation of an internal combustion engine, in certain operating phases, individual or all the cylinders of the internal combustion engine can be partially suppressed, for example, during a gearshift, or in overrun operation. Suppression is to be understood as meaning a short-term withdrawal of ignition and injection.

During the suppression, it is normally the case that oxygen or fresh air is pumped through the internal combustion engine, and the catalyst is “contaminated” with oxygen. In order to ensure the catalyst function, it is necessary for a rich fuel mixture to be set first of all when restarting the internal combustion engine following the suppression.

However, the rich operation results in increased fuel consumption. Moreover, a large drag torque occurs due to the pumping of air during the overrun phase by the internal combustion engine. The increased drag moment also has an adverse effect on energy efficiency.

DE 10 2019 115 761 B3, for example, has disclosed a method for controlling an internal combustion engine in which the cylinders of the internal combustion engine are suppressed for at least one working cycle and, in a further method step, at least one exhaust valve respectively assigned to the suppressed cylinders is kept closed for at least one exhaust stroke, which takes place before, during, and/or after the suppression of the cylinder.

According to DE 10 2019 115 761 B3, fresh gas is preferably enclosed during the suppression. At the end of the suppression, a fuel mixture can be injected into the enclosed fresh air and ignited, in order to prevent “contamination” of the catalyst. Afterwards, conventional internal-combustion-engine-powered operation may be continued. However, in this case, the transition from suppression to conventional operation with combustion is a problem because, in particular, the enclosed gas is unknown in terms of its exact composition.

It is an object of the present disclosure to further improve a control device for lean operation of an internal combustion engine with closable exhaust valves, in terms of increase in comfort and pollutant reduction.

In gasoline engines, for controlling the exhaust valves, the technology of exhaust switching cam followers (“ESCF”; exhaust valve switchable in a two-stage manner: open, closed) is increasingly being introduced. The control of the adjustable exhaust switching cam followers is intended to be further improved by the present disclosure in terms of more advantageous transition states and transition functions. If the transition from the closed state (so-called “ESCF operation”) of the exhaust switching cam followers to renewed opening (“exiting of ESCF operation”) is carried out in an uncoordinated manner, jolting can occur during driving due to uncontrolled combustion.

If the exhaust valve is kept closed, for example, from the last exhaust stroke before the suppression, the residual gas remaining in a combustion chamber of the internal combustion engine after ignition, which is normally discharged from the combustion chamber during normal combustion operation, is enclosed in the combustion chamber.

If the exhaust valve is first kept closed after the beginning of the suppression, instead of residual gas, fresh air is enclosed in the combustion chamber.

For the case in which the suppression lasts for multiple cycles, the exhaust valve is kept closed for the entire duration of the suppression accordingly.

Generally, during a suppression in the internal combustion engine, not just one cylinder is suppressed, but rather all the cylinders present are suppressed, wherein the suppression of multiple cylinders occurs in a slightly temporally offset manner owing to the different timing.

As soon as the internal combustion engine is ready for suppression, ignition and injection are deactivated in accordance with cycle.

Preferably, both an intake valve assigned to the suppressed cylinder and the exhaust valve are kept closed for at least one stroke immediately before, during, and/or after the suppression of the cylinder. In this way, fresh air can be neither sucked in nor discharged, whereby flushing of the catalyst with fresh air, which is also referred to as contamination, is particularly reliably avoided.

The inlet valve and the outlet valve are kept closed, for example, during the same working cycle. In this way, the combustion chamber remains completely closed for the duration of the suppression.

During the suppression, the enclosed gas (in particular, residual gas from the last combustion) can be repeatedly compressed. This is achieved, in particular, in that the combustion chamber remains completely closed during the suppression. The suppressed cylinder consequently acts like a gas spring.

A switching cam follower is a lever which can be brought into an actuation state or into a deactivation state via a two-stage actuator. In the actuation state, the switching cam follower, interacting with a cam shaft, can actuate an assigned valve. In the deactivation state, the switching cam follower cannot actuate the valve irrespective of a position of the camshaft, that is to say, if the switching cam follower has been deactivated, the valve remains closed.

The method according to the disclosure is applicable for conventional motor vehicles with an internal combustion engine, in particular, during an overrun operation of the internal combustion engine, and for hybrid vehicles, which, in addition to an internal combustion engine, have an electric motor for driving the motor vehicle.

On an intake side, the internal combustion engine may comprise a valve drive which is continuously adjustable. This makes it possible for a stroke of the intake valve to be continuously reduced and thus for a suppression of a cylinder to be prepared. Furthermore, it is consequently possible for an engine drag torque to be kept small. In particular, the engine drag torque is also reduced through deactivation of the exhaust valve. The reduction in the valve stroke of the intake side allows the drag torque to be reduced even further. Moreover, quick re-establishment of conventional internal-combustion-engine-powered operation can be achieved after the suppression.

According to the disclosure, the basically known operating strategy for keeping the exhaust valves closed as required, in particular via an exhaust switching cam follower, is refined as follows:

During the suppression, the residual gas of the last combustion before the suppression is enclosed as a result of early closure of the exhaust valve or of all the exhaust valves of a cylinder. Immediately after the closure of the exhaust valve(s), the exhaust valve or all the exhaust valves of a cylinder is/are closed too in order for as little fresh air as possible to be sucked in and enclosed.

The medium, in the form of residual gas, enclosed in the cylinder during the suppression has however an unknown composition, for example, dependent on thermodynamic disturbances. Said medium can contain at least a small proportion of fresh air, wherein the ratio of residual gas to fresh air can both be unknown and vary. An injection and ignition before the renewed opening of the exhaust valve after the suppression can thus result in unpredictable torque shocks ("jolts").

Therefore, according to the disclosure, at least at the first cylinder, after the suppression and exhaust-valve closure, first of all the exhaust valve is opened with intake valve closed, the enclosed medium is completely expelled, and then the intake valve is re-opened for intake of a defined (known) amount of fresh air, in order to subsequently continue with a defined and proper injection and combustion.

In this case, only a small proportion of undesired fresh air can be contained in the enclosed residual gas, this however having a less adverse effect on the catalyst than improper combustion on account of the unknown composition of the residual gas or of the previously enclosed medium.

It is, however, consequently possible for a defined optimum combustion according to a target torque requirement to be ensured again already with the next cycle.

The suppression with enclosure of the residual gas gives rise to a negative torque profile, which, in the case of use in a hybrid vehicle, is preferably compensated by the electric motor. Cyclical rotational irregularities when entering and/or exiting a suppression state can be compensated in principle by the electric motor.

From the end of the suppression, there is a transition for example firstly into fired overrun cut-off, in which at least the smallest ignitable amount of air is admitted. In this way, the reduced torque increases again. The difference from the required target torque is compensated during the transition phase likewise by the electric motor.

According to the disclosure, it is thus the case that the medium enclosed during the suppression is firstly discharged before the intake-valve stroke opens in a synchronized manner. That is to say, the first cylinder, which achieves the re-opening of the exhaust valve, acquires a defined filling and injection for the desired combustion.

The actuator of the exhaust valve, in the form of a switching cam follower, works in a cycle-based manner, and the actuator of the intake valve, in the form of a (fully) variable valve drive, works in a time-based manner for all the cylinders. If the intake valve opens too early, the cylinders with medium not yet flushed out acquire a fresh-air filling, which leads to undesired entry of oxygen in the catalyst system. For a quick transition into part load, the exhaust valves and the intake valves can be controlled in a synchronized manner, whereby it is possible for there to be cylinders with an amount of fresh air which has not yet been discharged. These may be injected into, however, in order for a combustion torque to be achieved, before the flushing-out process has finished. In this way, a quicker build-up of torque could be achieved. A discharge of the residual gas or the enclosed medium without injection and ignition can therefore be limited to the first cylinder after the suppression.

BRIEF DESCRIPTION OF THE DRAWINGS

Further advantages and features of the disclosure emerge from the following description and from the following drawings, to which reference will be made.

DETAILED DESCRIPTION OF THE DRAWINGS

Figure 1:
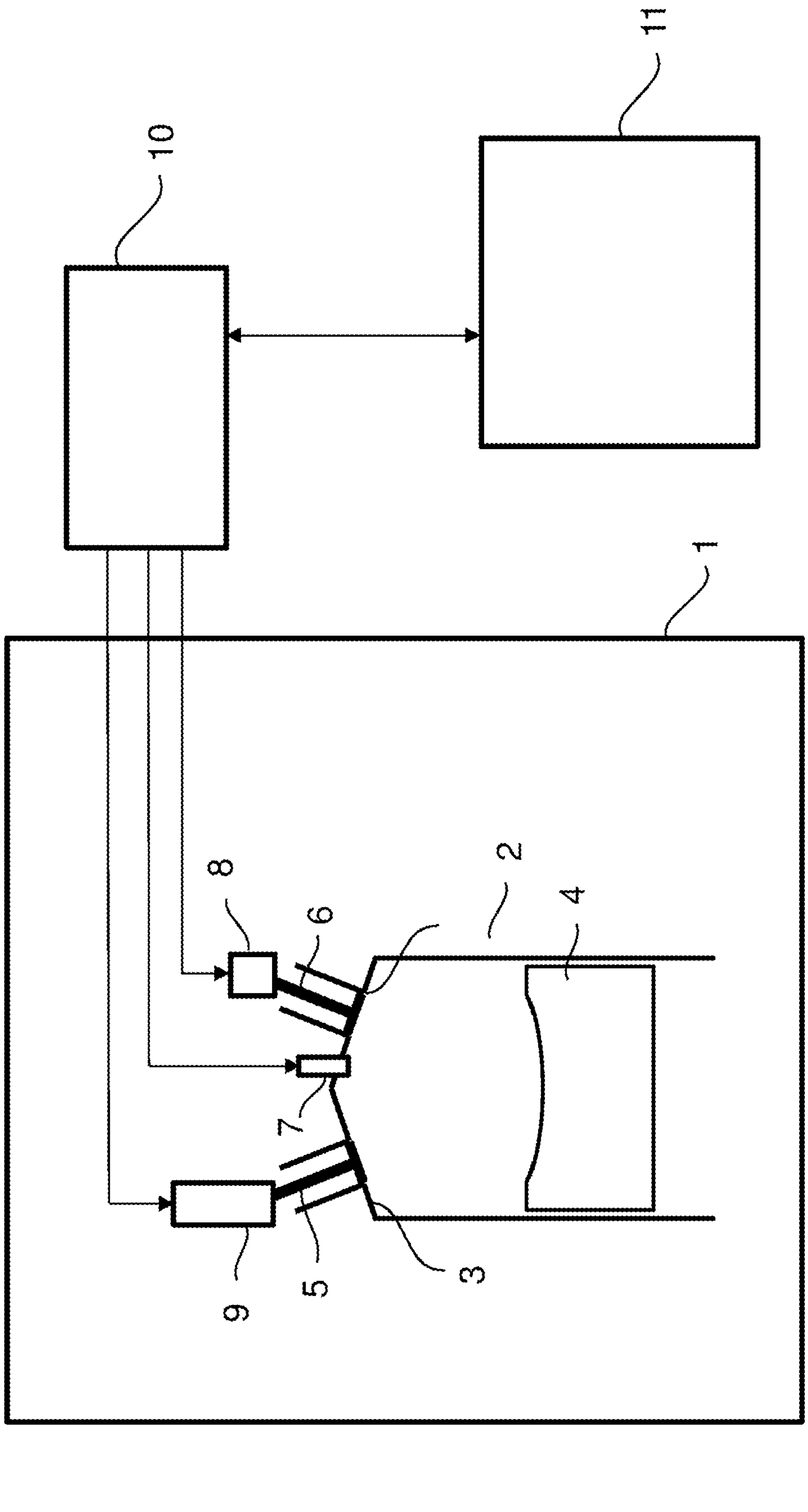
FIG. 1 shows the main components of the control device according to the disclosure; and, FIG. 2 shows an illustration of the torque profiles resulting from the disclosure during the transition from suppression into regulated combustion, for example, at least into fired overrun cut-off.

FIG. 1 schematically shows an internal combustion engine 1, for example, a gasoline engine, with multiple cylinders, with just one cylinder 2 being illustrated here in a representative manner. As is known, a cylinder 2 consists of a cylinder head 3 and a piston 4 which is movably mounted in the cylinder. Valve seats for at least one intake valve 5 and for at least one exhaust valve 6 and an ignition plug 7 are arranged in the cylinder head 3.

The general functioning of internal combustion engines is well known from the prior art, and will therefore not be discussed further at this juncture.

It is furthermore known that, during the operation of an internal combustion engine, in certain operating phases, individual or all the cylinders of the internal combustion engine can be partially suppressed, for example, during a gearshift.

In order for flushing of a catalyst with fresh air to be avoided, it is provided according to the disclosure that all the exhaust valves 6 assigned to the suppressed cylinder 2 are kept closed immediately after the last combustion before a suppression.

For this purpose, the internal combustion engine 1 has, on an exhaust side, a valve drive 8, which is variable at least in two stages, in order to open and to close the exhaust valves 6 of the internal combustion engine 1.

For example, the valve drive 8 on the exhaust side comprises, for example, a stage system which, in particular, has a valve with switchable hydraulic valve compensation, a camshaft with sliding cams, and/or has a switching cam follower.

If required, the valve drive 8 can be switched in such a way that the exhaust valve 6 remains closed in a cycle-independent manner. The valve drive 9, on an intake side, can be continuously adjustable. The valve drives 8 and 9 are, for the sake of simplicity, illustrated merely schematically in FIG. 1.

In order for the valve drives 8 and 9 to be controlled according to the disclosure and as required, provision is made of an electronic control unit 10 that is programmed accordingly. The electronic control unit 10 may be implemented, for example, by one or more processors or CPUs, and software or firmware stored in a memory and/or RAM.

Further implementation details of the disclosure will be described below on the basis of FIG. 2, with time t being illustrated on the x-axis and torque M being illustrated on the y-axis.

A working cycle of an internal combustion engine 1 normally consists of an intake stroke, during which fresh air is sucked in, a compression stroke, during which the sucked-in fresh air is compressed and a fuel mixture is injected into the combustion chamber of the internal combustion engine 1, a power stroke, during which the compressed mixture is ignited, and an exhaust stroke, during which the combusted gas is discharged from the combustion chamber via the exhaust valve 6.

A suppression takes place, for example, during an overrun operation or during a drag operation.

Overrun operation refers, in the case of a motorized vehicle, to a driving state in which, without a separation of the frictional connection, that is to say with non-open clutch, the internal combustion engine 1 is kept in motion by the vehicle mass. This driving state occurs, for example, during downhill travel. With hybrid vehicles, it is moreover possible for the internal combustion engine to be also driven along by the electric machine, in certain load states.

During the exhaust stroke taking place immediately before the suppression, that is to say, after the last ignition before the suppression, the exhaust valve 8 is kept closed. During the intake stroke taking place immediately before the suppression, the intake valve 9 is likewise kept closed. The residual gas which is discharged via the exhaust valve 8 during conventional operation is consequently enclosed in the cylinder 2.

During the last exhaust stroke before ignition commences again, the exhaust valve 8 is opened in accordance with cycle, so that the enclosed residual gas is discharged or flushed out without combustion (that is to say, without injection and ignition). Subsequently, the intake valve 9 is opened and fresh air is sucked in. Then, the operation of the internal combustion engine 1 is continued, that is to say, injection and ignition are activated in accordance with cycle.

A traction electric machine 11 is provided, in addition to the internal combustion engine 1, as a further drive motor in FIG. 1. Uncomfortable drops in torque of the internal combustion engine 1 are compensated by the superimposing torque M of the traction electric machine 11.

Figure 2:
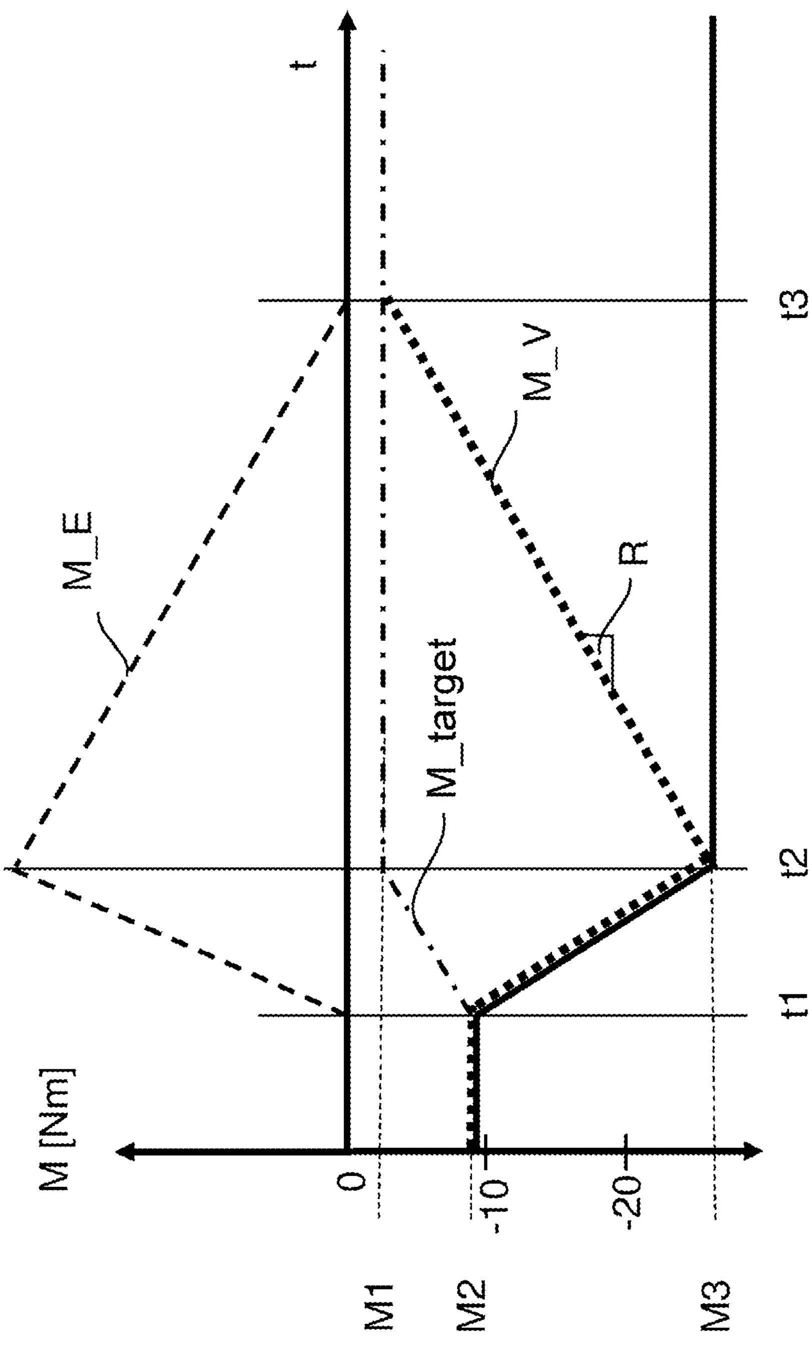

FIG. 2 illustrates the transition after suppression back into conventional internal-combustion-engine-powered operation, in particular, also with compensatory torque engagement of the traction electric machine 11.

The following torque levels are schematically illustrated in FIG. 2:

M1=maximum torque during fired overrun operation

M2=current torque before suppression and exhaust-valve closure

M3=minimum torque during fired overrun operation

The torque profile M_V of the internal combustion engine 1, which undergoes a cylinder suppression with exhaust-valve closure for enclosure of the residual gas up to time t1, which undergoes discharge of the residual gas without injection and ignition between times t1 and t2, and which is adjusted in a regulated manner up to the target torque, here M1, again, according to a predefined gradient, between times t2 and t3, is illustrated by a dotted line.

The V-shaped drop in torque of the torque profile M_V of the internal combustion engine 1 is compensated by the superimposing torque M_E of the traction electric machine 11:

1. The target torque M_E of the electric machine 11 is zero (0 [Nm]) before time t1 and after time t3 in this exemplary embodiment. Instead of a target torque M_E of zero for the electric machine 11, it is in principle possible for any operating point during traction or overrun operation to be predefined as a target torque M_E from which the compensation torque is imparted.
2. At time t2, the electric machine 11 has to make an adjustment, by way of its torque M_E, according to the increased drag torque M_V of the internal combustion engine 1 and the changed driver demand M_target.
3. From time t3, the driver demand M_target is again provided solely by the torque M_V of the internal combustion engine 1.

The target torque profile M_target, which can be initiated, for example, by a driver specification (for example switchover from depressed brake to accelerator pedal), which would result in an uncomfortable jolt without implementation of the present disclosure, is illustrated by a dash-dotted line.

The scenario of exiting "ESCF operation" is described in even greater detail below. According to the disclosure, the intention is for the unknown gas mixture in the cylinder to preferably not be ignited and to first of all be discharged. This results in increased engine friction. Subsequently, preferably at least the first cylinder is filled with a minimum amount of air and ignited with very low efficiency. Proceeding from there, the combustion is gradually brought to an optimum combustion in such a way that the torque build-up between time t2 and time t3 is achievable by way of a predefined shallow ramp R. The purpose of this shallow ramp R is to allow the best possible compensation by the electric machine 11; this is because a steep or uncontrolled gradient cannot be compensated well by the electric machine 11.

The transition from "normal operation" into ESCF operation can also be controlled in an analogous manner.

The invention claimed is:

1. A device for controlling an internal combustion engine in an electrified hybrid vehicle having a traction electric machine, wherein the internal combustion engine has multiple cylinders which are each equipped with at least one intake valve and at least one exhaust valve switchable in a two-stage manner, wherein:

multiple cylinders of the internal combustion engine are each able to be suppressed for at least one working cycle, wherein at least the exhaust valves are kept closed and an enclosed gas is formed in each suppressed cylinder, the exhaust valves and the intake valves of the cylinders of the internal combustion engine are controlled in a synchronized manner, and, at least in a first cylinder, from the end of the suppression, the exhaust valve is opened with the intake valve closed, and the enclosed gas is discharged without injection and ignition, and, in the first cylinder only, from the end of the suppression, the exhaust valve is opened with the intake valve closed, and the enclosed gas is discharged without injection and ignition, and in further suppressed cylinders after the first cylinder, from the end of the suppression, at least a predefined minimum amount of fuel is injected and ignited before the discharge of the enclosed gas.

2. The device according to claim 1, wherein a negative torque profile resulting from the suppression with enclosure of the enclosed gas is compensated by the traction electric machine.

3. The device according to claim 1, wherein the at least one exhaust valve switchable in a two-stage manner comprises a switching cam follower configured to be brought into an actuation state or into a deactivation state via a two-stage actuator, wherein in the actuation state, the switching cam follower interacts with a camshaft to actuate the exhaust valve, and in the deactivation state, the switching cam follower cannot actuate the exhaust valve irrespective of a position of the camshaft.

4. The device according to claim 1, wherein the internal combustion engine comprises, on an intake side, a valve drive which is continuously adjustable, such that a stroke of the intake valves is continuously reducible to prepare for suppression of a cylinder.

5. The device according to claim 1, wherein after the enclosed gas is discharged, the intake valve is re-opened for intake of a defined amount of fresh air, in order to subsequently continue with a defined injection and combustion.

6. The device according to claim 2, wherein cyclical rotational irregularities when entering and/or exiting a suppression state are compensated by the traction electric machine.

7. The device according to claim 1, wherein the enclosed gas comprises residual gas from a last combustion before the suppression, the residual gas being enclosed as a result of early closure of the exhaust valve.

8. The device according to claim 1, wherein both the intake valves and the exhaust valves assigned to the suppressed cylinders are kept closed for at least one stroke immediately before, during, and after the suppression, whereby flushing of a catalyst with fresh air is avoided.

9. The device according to claim 1, wherein during the suppression, the enclosed gas is repeatedly compressed such that the suppressed cylinder acts as a gas spring.

10. The device according to claim 1, wherein an actuator of the exhaust valve, in the form of a switching cam follower, works in a cycle-based manner, and an actuator of the intake valve, in the form of a variable valve drive, works in a time-based manner for all the cylinders.

11. The device according to claim 1, wherein the suppression takes place during an overrun operation, wherein the overrun operation is a driving state in which, without separation of a frictional connection, the internal combustion engine is kept in motion by a vehicle mass.

12. The device according to claim 1, further comprising an electronic control unit programmed to control the exhaust valves and the intake valves, wherein the electronic control unit comprises one or more processors and software or firmware stored in a memory.

13. The device according to claim 1, wherein the internal combustion engine has, on an exhaust side, a valve drive which is variable in at least two stages, in order to open and to close the exhaust valves.

14. The device according to claim 2, wherein a V-shaped drop in torque of a torque profile of the internal combustion engine is compensated by a superimposing torque of the traction electric machine.

15. The device according to claim 1, wherein the enclosed gas is discharged before the intake valve opens in a synchronized manner, such that the first cylinder acquires a defined filling and injection for a desired combustion.

16. The device according to claim 1, wherein after the discharge of the enclosed gas, a defined optimum combustion according to a target torque requirement is ensured with a next working cycle.

17. The device according to claim 1, wherein the suppression takes place during a drag operation.

18. A device for controlling an internal combustion engine in an electrified hybrid vehicle having a traction electric machine, wherein the internal combustion engine has multiple cylinders which are each equipped with at least one intake valve and at least one exhaust valve switchable in a two-stage manner, wherein:

multiple cylinders of the internal combustion engine are each able to be suppressed for at least one working cycle, wherein at least the exhaust valves are kept closed and an enclosed gas is formed in each suppressed cylinder, the exhaust valves and the intake valves of the cylinders of the internal combustion engine are controlled in a synchronized manner, at least in a first cylinder, from the end of the suppression, the exhaust valve is opened with the intake valve closed, and the enclosed gas is discharged without injection and ignition, and, wherein after the discharge of the enclosed gas without injection and ignition, subsequently, at least the first cylinder is filled with a minimum amount of air and ignited with very low efficiency, and proceeding from there, the combustion, for torque build-up, is adjusted in an increasing and controlled manner by way of a shallow ramp, which is predefined so as to be compensated by the traction electric machine.

19. The device according to claim 18, wherein from the end of the suppression, there is a transition into fired overrun cut-off, in which at least a smallest ignitable amount of air is admitted, and wherein a difference from a required target torque is compensated during a transition phase by the traction electric machine.

* * * * *